United States Patent
De Vleeschauwer et al.

(10) Patent No.: US 9,418,012 B2
(45) Date of Patent: Aug. 16, 2016

(54) CACHE MANAGER FOR SEGMENTED MULTIMEDIA AND CORRESPONDING METHOD FOR CACHE MANAGEMENT

(75) Inventors: Bart De Vleeschauwer, Schilde (BE); Rafaël Huysegems, Walem (BE); Tingyao Wu, Heverlee (BE)

(73) Assignee: Alcatel Lucent, Boulogne-Billancourt (FR)

( * ) Notice: Subject to any disclaimer, the term of this patent is extended or adjusted under 35 U.S.C. 154(b) by 95 days.

(21) Appl. No.: 13/983,857

(22) PCT Filed: Feb. 2, 2012

(86) PCT No.: PCT/EP2012/051732
§ 371 (c)(1),
(2), (4) Date: Oct. 14, 2013

(87) PCT Pub. No.: WO2012/107341
PCT Pub. Date: Aug. 16, 2012

(65) Prior Publication Data
US 2014/0032849 A1    Jan. 30, 2014

(30) Foreign Application Priority Data
Feb. 7, 2011    (EP) .................................. 11290076

(51) Int. Cl.
*G06F 3/00* (2006.01)
*G06F 13/28* (2006.01)
*G06F 15/16* (2006.01)
(Continued)

(52) U.S. Cl.
CPC ........ *G06F 12/0862* (2013.01); *G06F 12/0891* (2013.01); *G06F 17/30902* (2013.01)

(58) Field of Classification Search
None
See application file for complete search history.

(56) References Cited

U.S. PATENT DOCUMENTS

| 6,363,411 | B1 * | 3/2002 | Dugan | H04M 3/42136 379/201.01 |
| 6,370,605 | B1 * | 4/2002 | Chong, Jr. | G06F 3/0613 710/33 |
| 6,587,109 | B1 * | 7/2003 | Rose | G06T 13/20 345/428 |

(Continued)

FOREIGN PATENT DOCUMENTS

| CN | 101960841 A | 1/2011 |
| JP | 11053244 A | 2/1999 |

(Continued)

OTHER PUBLICATIONS

Yoshiaki Taniguchi, "Implementation and Evaluation of Cooperative Proxy Caching System for Video Streaming Services," Technical Report of IEICE, Japan, The Institute of Electronics, Information and Communication Engineers, Feb. 5, 2004, vol. 103, No. 650, pp. 13-18.

(Continued)

*Primary Examiner* — Michael Sun
(74) *Attorney, Agent, or Firm* — Fay Sharpe, LLP (57) ABSTRACT

The invention concerns a cache manager (100) for managing the intermediate caching of segmented multimedia items. Multiple versions are available of each multimedia item, each version representing the multimedia item with a different quality. The cache manager (100) comprises control means (101, 102) to control the pre-fetching and eviction of segments. The control means (101, 102) are at least responsive to temporal and quality related inter-segment relationships (131).

9 Claims, 4 Drawing Sheets

(51) Int. Cl.
*G06F 12/08* (2016.01)
*G06F 17/30* (2006.01)

(56) References Cited

U.S. PATENT DOCUMENTS

| | | | |
|---|---|---|---|
| 6,708,213 B1* | 3/2004 | Bommaiah | H04L 29/06 370/401 |
| 7,043,558 B2 | 5/2006 | Yoshida et al. | |
| 7,751,628 B1* | 7/2010 | Reisman | 382/232 |
| 8,385,725 B2 | 2/2013 | Kim et al. | |
| 2002/0029282 A1* | 3/2002 | Buddhikot | H04N 7/17354 709/231 |
| 2004/0049598 A1* | 3/2004 | Tucker et al. | 709/246 |
| 2004/0268053 A1 | 12/2004 | Fujisaki | |
| 2013/0086198 A1* | 4/2013 | Claman et al. | 709/213 |
| 2014/0173088 A1* | 6/2014 | Varney | H04L 67/289 709/224 |

FOREIGN PATENT DOCUMENTS

| | | |
|---|---|---|
| JP | 2000-209258 A | 7/2000 |
| JP | 2003-153229 A | 5/2003 |
| WO | WO 03/069480 | 8/2003 |

OTHER PUBLICATIONS

Takahiro Kimoto, "Fast Zapping Web TV Architecture Using Scalable Video Coding," Technical Report of IEICE, Japan, The Institute of Electronics, Information and Communication Engineers, Jul. 7, 2008, vol. 108, No. 127, pp. 19-24.

Yoshiaki Taniguchi, Implementation and Evaluation of Proxy Caching System for MPEG-4 Video Streaming with Quality Adjustment Mechanism, Technical Report of IEICE, Japan, The Institute of Electronics, Information and Communication Engineers, Jun. 13, 2003, vol. 103, No. 122, pp. 45-48.

International Search Report for PCT/EP2012/051732 dated Sep. 11, 2012.

* cited by examiner

CACHE MANAGER FOR SEGMENTED MULTIMEDIA AND CORRESPONDING METHOD FOR CACHE MANAGEMENT

FIELD OF THE INVENTION

The present invention generally relates to caching of segmented multimedia items that are available in multiple qualities, e.g. HTTP Adaptive Streaming (HAS) video segments that are encoded with different resolutions in different versions. The invention in particular attempts to improve the cache hit rate of rather small, intermediate caches in between the multimedia server and the client requesting the multimedia segments.

BACKGROUND OF THE INVENTION

Existing HyperText Transfer Protocol (HTTP) caches treat segmented video in a manner similar to HTTP web content. Typical algorithms that are used by the cache manager for eviction of segments from the cache memory or for pre-fetching segments from the content server for storage in the cache memory are based on least-recently-used (LRU) or least-frequently-used (LFU) mechanisms.

The main drawback of LRU or LFU based cache management when applied to segmented multimedia that is available in multiple qualities, resides in the fact that temporal dependencies and quality-based dependencies between the segments are not exploited, as a result of which the cache hit rate is not optimized.

European Patent Application EP 0 702 491 entitled "Video Optimized Media Streamer with Cache Management" describes an improved video cache that takes into account temporal dependencies between video segments for scheduling transfers between mass storage and a cache buffer. Thus, the nature of video streams with temporally ordered segments is used in pre-fetching video segments in order to improve the cache efficiency.

EP 0 702 491 however does not consider the availability of multiple qualities of a single video item and the possibility for the client to dynamically switch between these qualities depending for instance on the availability of resources. As a result, the cache algorithm disclosed in EP 0 702 491 does not optimize the cache hit rate when multimedia items can be requested in different qualities and the requested quality may adaptively change during consumption of the multimedia like for instance with HTTP Adaptive Streaming (HAS) of video.

In particular for intermediate cache nodes with limited capacity, e.g. HTTP caches in access nodes, improvements in the caching algorithms may result in significant increase of the cache hit rates and consequently of the benefit/cost ratio when deploying such caches.

It is therefore an objective of the present invention to disclose a cache manager and a corresponding cache management method that resolves the above mentioned shortcomings of existing solutions. More particularly, it is an objective to disclose a cache manager and corresponding cache management method with improved cache hit rate for segmented multimedia available in multiple qualities.

SUMMARY OF THE INVENTION

According to the present invention, the above defined objective is realized by a cache manager for managing the intermediate caching of segments of multimedia items of which multiple versions are available, each version representing a multimedia item with a different quality, the cache manager comprising control means to control pre-fetching of segments of the multimedia items into a cache memory and eviction of segments of the multimedia items from the cache memory, these control means being responsive to information indicative for temporal and quality related inter-segment relationships between segments of the multiple versions of the multimedia items. Such cache manager is defined by claim 1.

Thus, the basic idea underlying the current invention is to exploit specific knowledge on inter-segment relationships, both temporal and quality-related, to improve the cache eviction and pre-fetching efficiency. Indeed, when a user is for instance watching a video at a certain point in time by downloading a segment with quality level Q and segment identifier ID, the likelihood that the user will be interested in viewing segment ID+1 with a quality level that is close to Q, is relatively high. More generally, segments with IDs that are subsequent to the ID of the multimedia segment that is currently consumed are more likely to be requested by the user than segments that are further away in time from the currently consumed segment. Moreover, the quality level of future requested multimedia segments is more likely to be close to the currently consumed quality level. The combined temporal and quality-dependent relationships between segments therefore shall enable to pre-fetch multimedia segments that are more likely to be requested in the near future, and to remove segments that are less likely to be requested in the near future. Obviously, this will result in improved cache hit rates, i.e. higher availability of requested segments in the cache.

It is noticed that the temporal and quality related inter-segment relationships may be combined with traditional criteria such as popularity, time and date of last usage, etc., in order to optimize the cache hit rate. As will be explained below, the temporal and quality related inter-segment relationship knowledge may further be supplemented with less traditional criteria such as user profile information, history information, and network load information to further optimize the cache hit rate. Additionally, the system could use information that is bound to the content itself, e.g. a sports game or talk show, but also information indicative for typical jump-points in time, e.g. the start of a commercial, the end of an interview, etc.

Optionally, as defined by claim 2, the cache manager according to the current invention comprises means to extract the temporal and quality related inter-segment relationship information from one or more multimedia presentation description file, e.g. the manifest files related to the multimedia items.

Indeed, the relationship between segments when using adaptive streaming technology is typically described in the so called multimedia presentation description (MPD) file, e.g. the manifest file. This manifest or MPD file could therefore be exploited by the cache manager according to the present invention to establish knowledge on the relationship between segments in an HTTP adaptive streaming session.

Further optionally, as defined by claim 3, the control means may be adapted to be responsive at start-up to popularity information of the multimedia items.

Indeed, at the start of a movie for instance, little information will be available on the active sessions and the inter-segment relationships. Therefore, general popularity information could be taken into account at this point in time to control the pre-fetching and eviction of segments.

According to a further optional aspect defined by claim 4, the means to control pre-fetching and eviction of segments may be adapted to be responsive to one or more of the following:

user profile information;

segment popularity information;
user history information:
session history information;
content history information;
content information supplied by a content owner/producer;
network load between a multimedia server and said cache memory;
network load between said cache memory and end user equipment;
client side algorithm information.

Thus, additional information can be taken into account by the segment pre-fetching and eviction algorithm. The extra information can be a user profile describing for instance typical bandwidth available for a given user, segment popularity information indicative for the amount of times a given segment has been requested, user history describing for instance the zapping behaviour of a given user, content history describing for instance the typical points in time where the user stops consuming a given multimedia item, session history describing for instance the typical quality level(s) that are requested in a given session, the load or available resources in the part of the network between the multimedia server and the cache and/or in the part of the network between the cache and client, and knowledge on specific client side algorithmic strategies. The latter may for instance include information on the client side buffering. When a Smoothstreaming client for instance notices that its buffer fill level for viewing video is lower than a threshold value, it may switch automatically to the lowest possible quality in order to avoid interruptions. Keeping the corresponding low quality segments in cache may therefore be a valuable strategy that optimizes the cache hit rate for such clients. Knowledge on the load or available resources in the network part between server and cache may be exploited to determine how aggressively segments will be pre-fetched.

In order to control the pre-fetching of segments and the eviction of segments, the cache manager according to the current invention hence may not only consider temporal and quality dependent inter-segment relationships, but may also exploit any combination of the aforementioned information types in order to further optimize the cache hit rate and benefit/cost ratio of multimedia cache deployment.

As is further specified by claim 5, the cache manager according to the current invention may further comprise means for machine learning the temporal and quality related inter-segment relationships.

Thus, the software/hardware that is used to determine which segments to remove from the cache and which segments to pre-fetch from the mass store, could be based on a machine learning algorithm that dynamically adapts itself to the environment wherein it is deployed. An advantage thereof is that updates to existing clients or the behaviour of new clients in the network can be learned. This way, excessive software upgrades for intermediate caching nodes are avoided.

In an embodiment of the cache manager according the invention, defined by claim 6, the means to control pre-fetching and eviction of segments may be further adapted to maintain and/or assign values to segments stored in the cache memory, each value representing a likelihood that a corresponding segment of a version of a multimedia item will be requested, considering the temporal and quality related inter-segment relationships.

Indeed, a simple way to implement the current invention consists in maintaining values for each segment in each version of the multimedia item. These values represent the likelihood that a segment will be requested and consequently also the interest for keeping a segment in cache. Each value is determined in function of the temporal relationship and quality relationship between the segment under consideration and the recently requested segments of the same multimedia item. Eventual additional information may be exploited to determine/fine-tune the values. The values are updated each time one or more segments are requested.

According to a further advantageous aspect of the invention, defined by claim 7, the cache manager may comprise re-direction means adapted to instruct re-direction of a multimedia session from a first cache node to a second cache node, the re-direction means being responsive at least to network topology information mapping clients to one or more caching nodes.

Thus, the information that is used to optimize the pre-fetching and segment eviction decisions according to the current invention may further be exploited to re-direct a multimedia session, e.g. a video streaming session by a client, to another cache node in the network. This may be advantageous for instance in a situation where the same multimedia session is already delivered by another cache node to another client, eventually slightly delayed in time. When a cache node is handling a multimedia session and watches the segment with identifier ID and quality level Q, the likelihood that in the session a request for the segment with identifier ID+1 and quality level Q will also be issued will be high. Thus it may be advantageous to redirect this session request to a cache node that handles a session that is already handling a session for the same content and that is watching the segment identifier ID+1 and quality level Q.

For determining which caching node should handle a session, typically topology information is used in the prior art and no dedicated information on the HAS session is taken into account. As a result, sessions are traditionally redirected to a nearby caching node. In order to be able to efficiently re-direct multimedia sessions, the cache manager according to the invention could use network topology information, e.g. a list mapping clients to one or several cache nodes that are closely located. Additional information like the actual load of the cache nodes, i.e. the cache node receiving the request and the cache node whereto the session will be re-directed, as well as particular information on the sessions handled by the different caching nodes, including time and quality information of these sessions, will improve the efficiency of the re-directing algorithm. Additional information may include prior knowledge on the expected popularity of the session. In order to share the network topology information and eventual additional information on the load and sessions handled by the different caching nodes, a protocol enabling to communicate this information between the caching nodes or a protocol enabling to distribute this information through mediation of a central platform, must be implemented.

It is further noticed that the re-direction of a multi-media session according to the current invention may be controlled at segment level, i.e. one or more segments of a session are delivered through another caching node, or may be controlled at session level, i.e. the entire multimedia session is re-directed to another caching node.

In addition to the cache manager defined by claim 1, the current invention also relates to a corresponding method for managing the intermediate caching of segments of multimedia items of which multiple versions are available, each version representing a multimedia item with a different quality, the method comprising controlling pre-fetching of segments of the multimedia items into a cache memory and eviction of segments of the multimedia items from the cache memory in response to information indicative for temporal and quality related inter-segment relationships between segments of the multiple versions of the multimedia items. This corresponding method is defined by claim 8.

As is indicated by claim 9, the method according to the invention optionally may comprise re-directing a multimedia session from a first cache node to a second cache node thereby using at least network topology information mapping clients to one or more caching nodes.

DETAILED DESCRIPTION OF EMBODIMENT(S)

Figure 1:
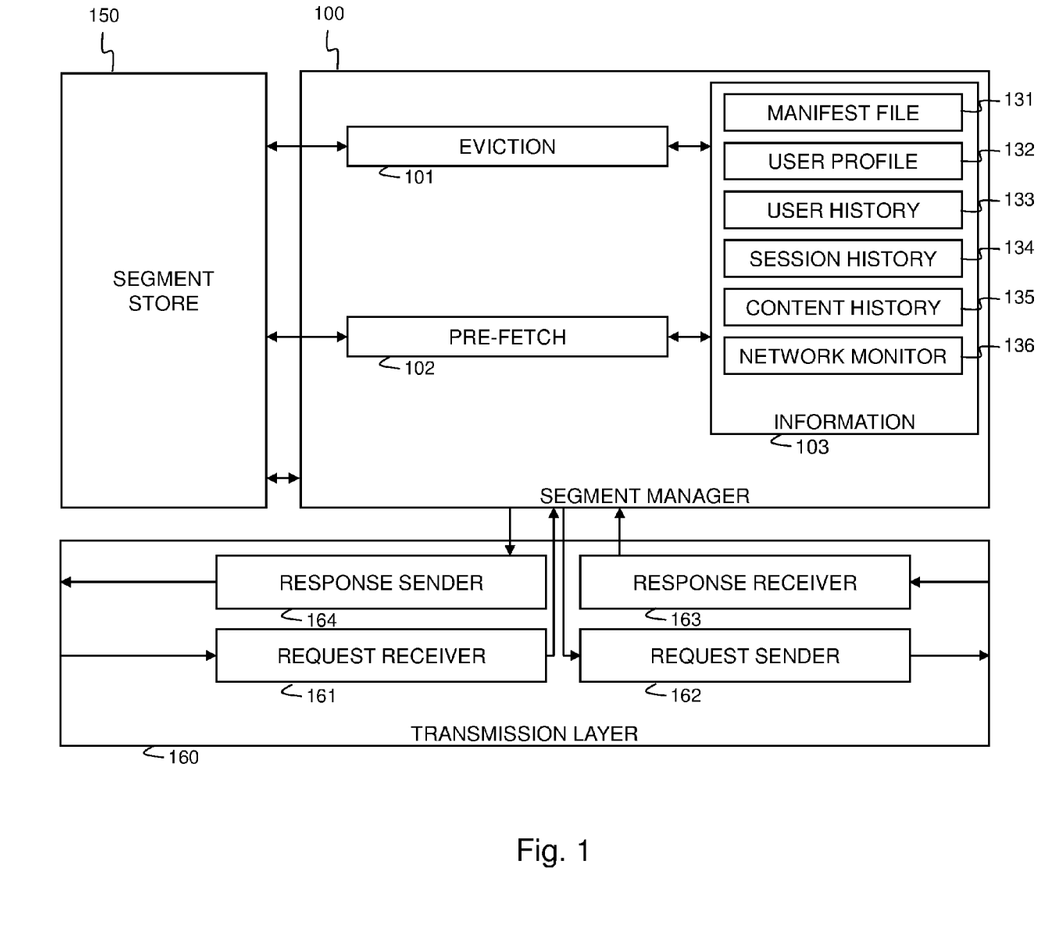
FIG. 1 is a functional block scheme of an embodiment of the cache manager 100 according to the present invention.

FIG. 1 depicts a segment store or cache 150, a segment manager 100, and the underlying transmission layer 160.

The segment store 150 is a simple memory component that contains a number of multimedia segments. Segments can be requested from it and injected in it. Additionally, the memory component can be monitored and will return information on the segments that are available.

The segment manager 100 represents a first embodiment of the cache manager according to the present invention. The segment manager 100 is responsible for answering requests for segments from clients, contains a pre-fetch component 102 for pre-fetching and inserting segments in the segment store 150, and an eviction component 101 for eviction or removal of segments from the segment store 150. Additionally, the segment manager 100 is also responsible for requesting segments from a remote entity, a mass multimedia store, when these segments are not present in the segment store 150 and will have the possibility to store these segments in the segment store 150 when it decides to do so. At last, the segment manager 150 will also store information on the requests it sees into various information components 103 that are responsible for maintaining relevant data on the multimedia traffic. These information components 103 may be internal or external to the segment manager 100.

In the information component 103 contains a variety of components that essentially capture global and local information to aid the segment eviction and pre-fetch algorithms in making their decisions. The examples shown in FIG. 1 include the manifest file(s) 131 with information on how the segments of a given session are linked temporally and quality-wise, user profile information 132, user history information 133 on a particular user, session history information 134 on a specific session, content history information 135 on how specific content is typically consumed, and information on the monitored network load 136. However, this is a non-exhaustive list and other additional information could be used in the eviction and pre-fetch algorithms of alternative embodiments of the current invention.

The eviction component 101 is responsible for determining which segments should be removed from the segment cache 150. To do this, the eviction component 101 makes use of the various types of information 131, 132, 133, 134, 135 and 136 that are available in the information component 103.

The pre-fetch component 102 is responsible for determining which segments to pre-fetch from the multimedia mass store. To do this, the pre-fetch component 102 also makes use of the various types of information 131, 132, 133, 134, 135 and 136 that are available in the information component 103.

The request receiver 161, the request sender 162, the response receiver 163, and the response sender 164 constitute the message interface to the external world. Basically, these provide the transmission layer 160 for communicating with other entities in the network, like clients and mass stores.

It is noticed that the invention can be used in a system where a combination of HTTP Adaptive Streaming (HAS) with Scalable Video Coding (SVC) is used. This is for instance the case in the MPEG DASH (Dynamic Adaptive Streaming of HTTP) standard specification. SVC encodes different versions of a video file in hierarchically structured layers. The base layer represents a low quality version of the video file. Enhancement layers are built on the base layer to generate higher quality versions of the video file. In such a system, the benefit brought by the cache manager according to the present invention is even bigger because lower layers, e.g. the base layer, are always required for a segment. Whereas higher, enhancement layers may be removed from the cache, the base layer may be kept since it is needed for all versions of the video file.

Figure 2:
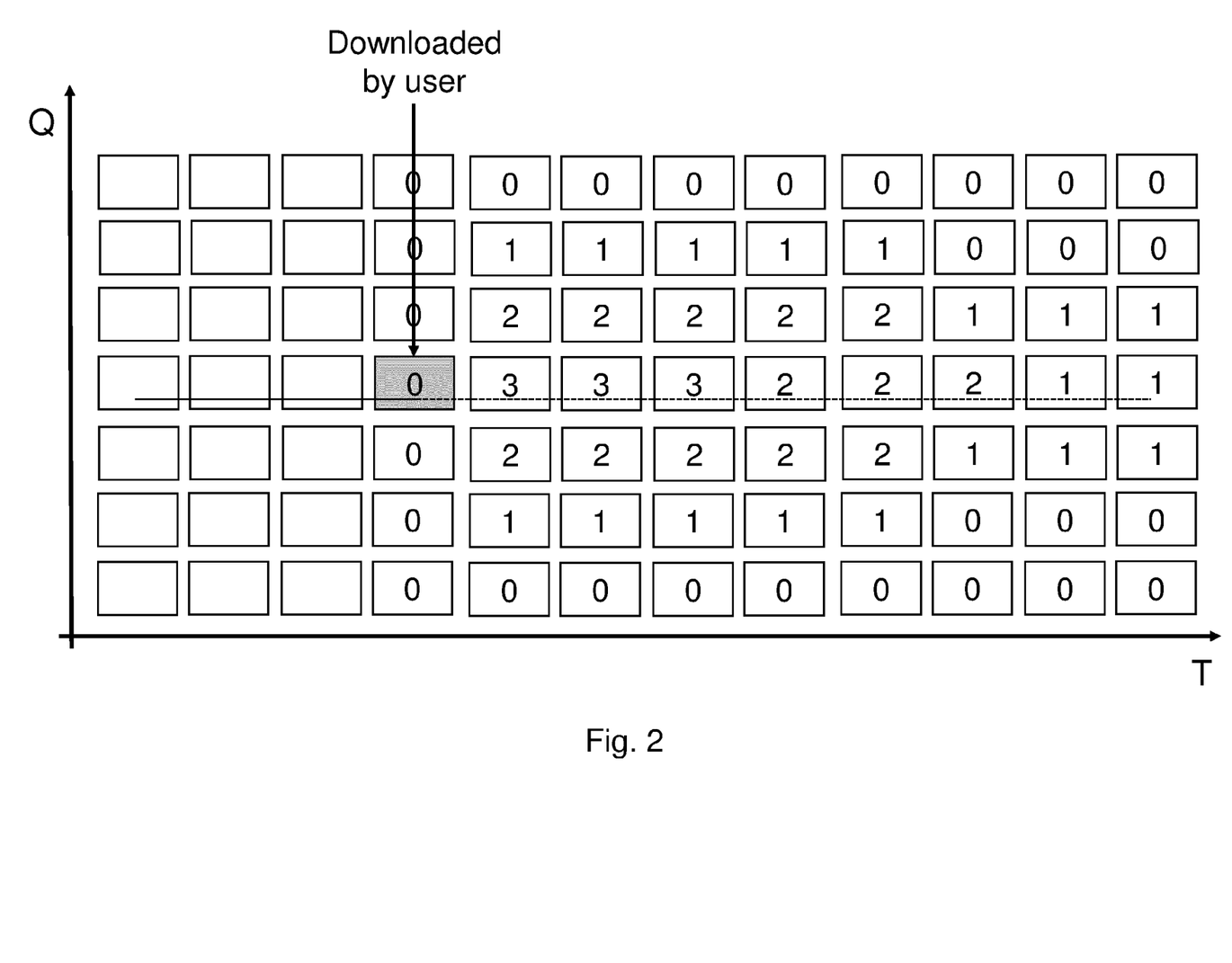
FIG. 2 illustrates operation of a second embodiment of the cache manager according to the present invention when a single session wherein a multimedia item available in multiple qualities Q is downloaded, is active.
Figure 3:
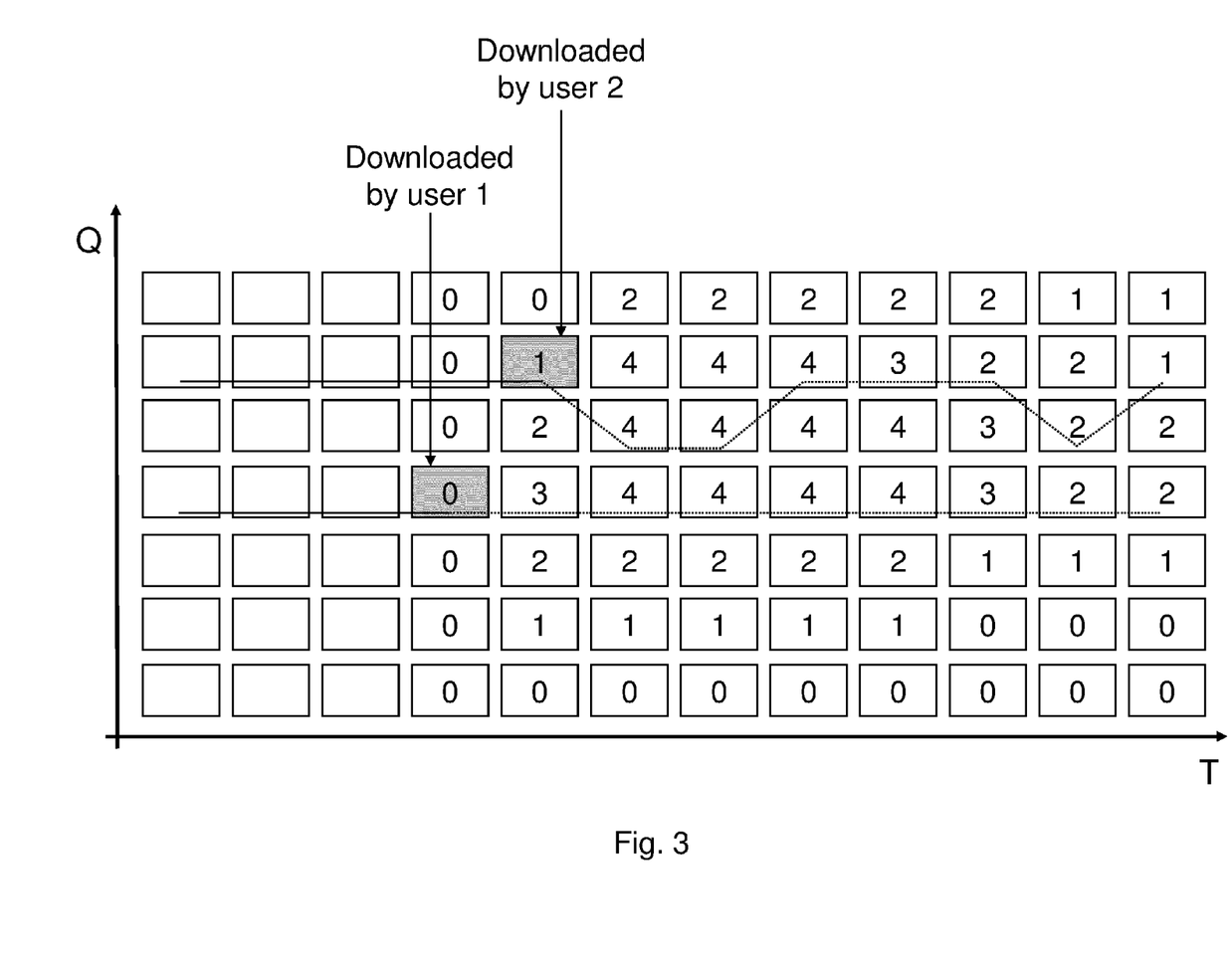
FIG. 3 illustrates operation of a third embodiment of the cache manager according to the present invention when two sessions wherein a multimedia item available in multiple qualities Q is downloaded, are active.

FIG. 2 and FIG. 3 illustrate the operation of a second embodiment of the cache manager operating according to the principles of the invention. In this second embodiment a value is maintained for each segment of a video file (horizontal axis T) at each quality level (vertical axis Q). FIG. 2 illustrates a situation where a single user downloads at a given point in time a particular segment, i.e. the shaded segment in FIG. 2. The horizontal dashed line shows the consecutive segments of the video file that the user is assumed to download. At the point in time where the user downloads the shaded segment, the cache manager according to the invention assigns values to other segments. These values depend on temporal and quality related inter-segment relationships, and represent a measure for the likeliness that a segment will be requested by the user. A simple strategy to assign such values to the segments could be as follows:

the first three segments of the same quality level, following the segment that is currently being downloaded are increased by 3.

the subsequent three segments at the same quality level are increased by 2;

the subsequent three segments at the same quality level are increased by 1;

the segments with a quality level difference of 1, and a segment identifier that differs at most 5 from the currently downloaded segment identifier get an increase of 2, the subsequent 4 segments at a quality level difference of 1 are increased by 1; and the segments with a quality level difference of 2, and a segment identifier that differs at most 5 from the currently downloaded segment identifier get an increase of 1.

If it is assumed that the values of all segments were 0 before downloading the shaded segment, FIG. 2 represents the values of the segments at the different quality levels after downloading the shaded segment.

FIG. 3 illustrates the same embodiment in a situation where a first user downloads a first shaded segment, and a second user downloads a second shaded segment. The segment downloaded by the second user constitutes a later segment, and the second user downloads this later segment with a higher quality level than the first user is viewing. When it is again assumed that the values of all segments were 0 before the first and second users were downloading the shaded segments, FIG. 3 represents the values of the segments at the different quality levels after user and user 2 have downloaded their respective segment at their respective desired quality. The dotted lines in FIG. 3 further represent the assumed sequence of segments that will be downloaded by the first and second user.

The above explained assignment of values is repeated for all active sessions and the final value assigned to the segments is normalized. The eviction component and pre-fetching component of the cache manager according to the invention shall base their decisions for eviction of segments from the cache and pre-fetching of segments into the cache on these values. Segments with a high value are least likely to be removed from the cache by the eviction component. Segments with high values that are not yet in the cache are likely to be pre-fetched from mass store by the pre-fetching component.

In an alternative embodiment that also maintains importance values for segments, the cache manager assigns a value to specific segments that are in the cache. It is assumed that all the segments have the same duration. When a segment is removed from the cache, the eviction component in the cache manager selects the one with the lowest value. In the algorithm, S(m) denotes the set of all segments of a movie m. Each segment is identified by an integer value s representing the order in which the segments are typically downloaded and Q(s) represents the quality corresponding to a segment s. The cache importance of a segment is the value that represents to what extent it is interesting to keep this segment in the cache. The scheme to assign these values in the third embodiment is as follows:

```
For all the active users u that are watching a movie m {
  For all i belonging to S(m), where i>s {
    i_importance = i_importance + f(i, s);
  }
}
```

Herein:
m represents the movie being watched by user u;
s represents the identifier of the segment of movie m being watched by user u;
q represents the quality of segment s;
i represents an integer index;
i_importance represents the importance value of the segment with identifier i; and
f(i,s) is a function used to calculate the increase in importance for a segment i when it is known that user u is currently watching segment s of the same movie m.

An example function f(i,s) could be the following:

$$f(i,s) = 1 + \frac{|100-(i-s)|}{1+|Q(i)-Q(s)|} + \min\left(20, \frac{(i-s)|Q(i)-Q(s)|}{10}\right)$$

This function f(i,s) assigns a higher importance to segments that are close in time to the currently watched segments. This function f(i,s) also allows for a varying quality by letting the estimation of the expected quality to be higher for segments that are near in time and assuming that segments that are further away in time would have a much more equal importance for the quality versions that are available.

In this third embodiment it is preferred to reserve part of the cache memory for the initial segments belonging to the video streams. This would ensure that segments at the start of a movie, which would have a lower likelihood to be in the cache when the previous algorithm is used, are kept available.

In a fourth embodiment of the cache manager according to the present invention, a learning mechanism is used to learn the likelihoods of requesting segments close to the currently watched segments, either in time or in quality. One plausible technique consists in training a Markov chain for different historical requesting paths. Given a training set, the probability of requesting segment Q(s+1) can be estimated as $P(Q(s+1)|Q(s), Q(s-1), \ldots, Q(1))$, which assumes that the requesting quality by HTTP adaptive streaming in the near future (s+1) does not only depend on the current quality, but also rely on the historical requesting qualities.

To simplify the computation and avoid the data sparseness, $P(Q(s+1)|Q(s), Q(s-1), \ldots, Q(1))$ can be approximated as $P(Q(s+1)|Q(s), Q(s-1), \ldots, Q(s-n))$, where n is denoted as the length of the retrieved quality path. The parameter n needs to be optimized. Similarly, it is possible to statistically estimate $P(Q(s+2), Q(s+1)|Q(s), Q(s-1), \ldots, Q(s-n)), \ldots, P(Q(s+t), \ldots, Q(s+1)|Q(s), Q(s-1), \ldots, Q(s-n))$ from the training set.

In test, given the requesting path $Q(s), Q(s-1), \ldots, Q(s-n)$, the maximum likelihood criterion is used to select the least important segment based on the Markov chain obtained from the training set. An incremental learning can also be incorporated to adaptively update the parameters in the Markov chain in order to fit the new network conditions. This learning could be done for each video individually, for an individual client, but also on aggregates.

Figure 4:
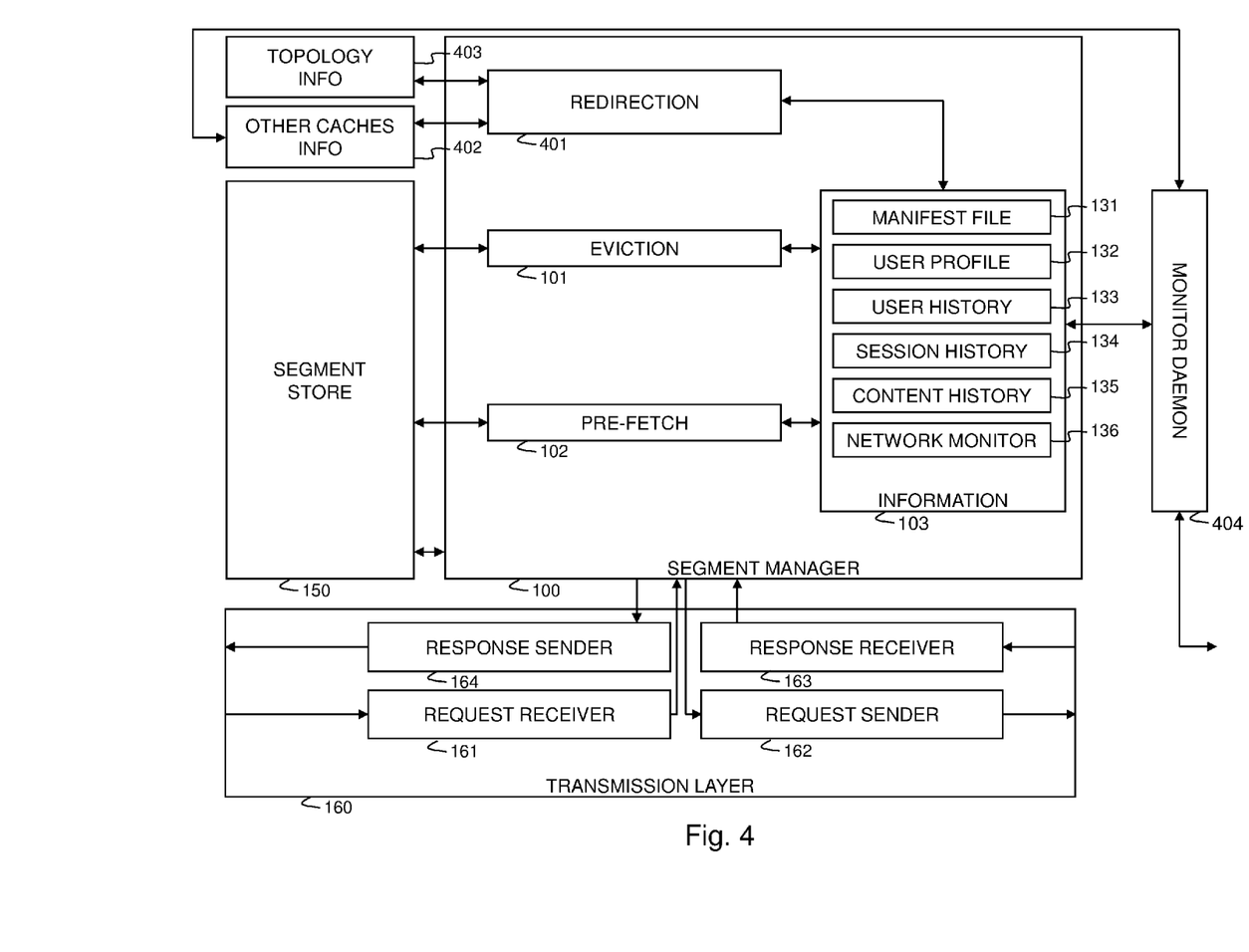
FIG. 4 illustrates a functional block scheme of an embodiment of the cache manager according to the present invention with re-direct component.

FIG. 4 depicts a block diagram of a cache node wherein the cache manager 100 has a redirection component 401. The reference numbers used in FIG. 1 are re-used in FIG. 4 to refer to functional blocks that implement the same functionality. The cache node illustrated by FIG. 4 further contains information 403 on the network topology and information 402 on other cache nodes to which session requests can be redirected. A monitor daemon component 404 takes care of sending monitor information to other cache nodes and retrieving monitor information from other cache nodes. An example algorithm would work as follows: the cache node depicted in FIG. 4 determines the cache nodes that are closer to the client issuing the request. It then orders these nodes based on their proximity to the client and starts with the cache node closest to the client. If this node, below denoted as c, handles sessions for the same content, the cache node of FIG. 4 determines whether this node would be a valid candidate for redirection. This could be done in the following way. Suppose the request S is for a segment with temporal identifier ID and quality identifier Q, go through all of the sessions for the same content. The memory available in the candidate cache node is X.
c=candidate cache node
Decision_value=0.0
For all sessions s, handled by c, for the same content do

```
If identifier (s) < ID + X do
  If quality(s) = quality (S) do
    Decision_value = 1.0
  done
  else do
    Decision _value_+ = 1/(10*|(quality(s)-quality (S)|)
  done
```

-continued

```
        done
done
If Decision_value > threshold_value do
        Redirect (S, c)
done
```

The initial cache node could follow this procedure for all the candidate cache nodes and when it would find a node c where the redirect decision is reached, redirect the session. If no suitable candidate node c would be found, it would handle the request itself.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A cache manager configured to manage the intermediate caching of segments of multimedia items of which multiple versions are available, each version representing a multimedia item with a different quality,
wherein the cache manager comprises a control processor adapted to control pre-fetching of segments of the multimedia items from a mass multimedia store into a cache memory and adapted to control eviction of segments of the multimedia items from the cache memory, the control processor being responsive to information indicative of temporal and quality related inter-segment relationships between segments of the multiple versions of a multimedia item in order to pre-fetch segments of the multimedia item that are more likely to be requested in the near future, such as segments that are subsequent to a currently consumed segment and having a quality level close to a currently consumed quality level, and to remove segments of the multimedia item that are less likely to be requested in the near future.

2. The cache manager according to claim 1, further comprising a processor configured to extract the information from one or more multimedia presentation description files related to the multimedia items.

3. The cache manager according to claim 1, wherein the control processor is further adapted to be responsive at start-up to popularity information of the multimedia items.

4. The cache manager according to claim 1, wherein the control processor is further adapted to be responsive to one or more of the following:
    user profile information;
    segment popularity information;
    user history information:
    session history information;
    content history information;
    content information supplied by a content owner/producer;
    network load between a multimedia server and the cache memory;
    network load between the cache memory and end user equipment;
    client side algorithm information.

5. The cache manager according to claim 1, further comprising a processor configured for machine learning the temporal and quality related inter-segment relationships.

6. The cache manager according to claim 1, wherein the control processor is further adapted to maintain and/or assign values to segments stored in the cache memory, each value representing a likelihood that a corresponding segment of a version of a multimedia item will be requested, considering the temporal and quality related inter-segment relationships.

7. The cache manager according to claim 1, further comprising a re-direction processor configured to instruct re-direction of a multimedia session from a first cache node to a second cache node, the re-direction processor being responsive at least to network topology information mapping clients to one or more caching nodes.

8. A method for managing the intermediate caching of segments of multimedia items of which multiple versions are available, each version representing a multimedia item with a different quality,
wherein the method comprises controlling pre-fetching of segments of the multimedia items from a mass multimedia store into a cache memory and controlling eviction of segments of the multimedia items from the cache memory in response to information indicative for temporal and quality related inter-segment relationships between segments of the multiple versions of a multimedia items in order to pre-fetch multimedia segments of the multimedia item that are more likely to be requested in the near future, including segments that are subsequent to a currently consumed segment and having a quality level close to a currently consumed quality level, and to remove segments of the multimedia item that are less likely to be requested in the near future.

9. The method according to claim 8, further comprising re-directing a multimedia session from a first cache node to a second cache node thereby using at least network topology information mapping clients to one or more caching nodes.

* * * * *